(12) United States Patent
Wang et al.

(10) Patent No.: US 11,405,303 B2
(45) Date of Patent: Aug. 2, 2022

(54) INTELLIGENT DECISION-MAKING METHOD AND DEVICE FOR UAV FORMATION INFORMATION INTERACTION TOPOLOGIES IN COMMUNICATION INTERFERENCE

(71) Applicant: Hefei University of Technology, Anhui (CN)

(72) Inventors: Guoqiang Wang, Anhui (CN); He Luo, Anhui (CN); Xiaoduo Li, Anhui (CN); Xiaoxuan Hu, Anhui (CN); Xin Cao, Anhui (CN); Huawei Ma, Anhui (CN); Wei Xia, Anhui (CN); Peng Jin, Anhui (CN); Ya Li, Anhui (CN)

(73) Assignee: Hefei University of Technology, Hefei (CN)

( * ) Notice: Subject to any disclaimer, the term of this patent is extended or adjusted under 35 U.S.C. 154(b) by 178 days.

(21) Appl. No.: 16/837,000

(22) Filed: Apr. 1, 2020

(65) Prior Publication Data

US 2021/0119900 A1  Apr. 22, 2021

(30) Foreign Application Priority Data

Oct. 18, 2019  (CN) .......................... 201910991172.2

(51) Int. Cl.
*H04L 45/02*  (2022.01)
*B64C 39/02*  (2006.01)
(Continued)

(52) U.S. Cl.
CPC ............ *H04L 45/02* (2013.01); *B64C 39/024* (2013.01); *H04L 45/28* (2013.01); *H04W 84/18* (2013.01)

(58) Field of Classification Search
None
See application file for complete search history.

(56) References Cited

U.S. PATENT DOCUMENTS

2002/0067693 A1* 6/2002 Kodialam ............... H04L 45/12
370/216
2019/0318635 A1* 10/2019 Yeh ....................... G08G 5/0069
(Continued)

FOREIGN PATENT DOCUMENTS

| CN | 104573646 A | 4/2015 |
| CN | 104411559 B | 4/2018 |
| CN | 109212521 A | 1/2019 |

OTHER PUBLICATIONS

Lav Gupta, Raj Jain, and Gabor Vaszkun. "Survey of Important Issues in UAV Communication Networks", Nov. 2015, IEEE Communications Surveys and Tutorials, vol. PP, Issue 99 (Year: 2015).*
(Continued)

*Primary Examiner* — Noel R Beharry
*Assistant Examiner* — Rodrick Mak

(57) ABSTRACT

An intelligent decision-making device and method for UAV formation information interaction topologies in communication interference, comprising: acquiring a three-dimensional UAV formation without communication interference, an initial communication network $D_1$ and an initial information interaction topology $T_1$; acquiring communication links $A_0$ interrupted by UAV formation with communication interference; acquiring interrupted communication links $A_1$ in $T_1$ based on $A_0$ and $T_1$; determining whether $A_0$ affects $T_1$; if not, $T_1$ being the final information interaction topology; if yes, acquiring substitute reverse arcs of $A_1$ and substituting $A_1$ with them to obtain an information interaction topology $T_2$; determining whether $T_2$ is a three-dimensional persistent graph; if yes, $T_2$ being the final information interaction topology; if not, acquiring an undirected graph $R_1$ corresponding to $T_2$; acquiring spare edges based on $R_1$; and
(Continued)

adding an arc corresponding to a spare edge in $T_2$ based on the spare edges to obtain a final information interaction topology.

6 Claims, 1 Drawing Sheet

(51) Int. Cl.
*H04L 45/28* (2022.01)
*H04W 84/18* (2009.01)

(56) References Cited

U.S. PATENT DOCUMENTS

| | | | |
|---|---|---|---|
| 2020/0033849 A1* | 1/2020 | Yiu | G05D 1/0607 |
| 2020/0264636 A1* | 8/2020 | Zhang | G08G 5/0039 |

OTHER PUBLICATIONS

Yongjian Luo, Min Zhu, Xiaoshuang Wang, Ran Li, Xugang Liu. "Study on dynamic network topology optimization of UAV", 2019 International Conference on Virtual Reality and Intelligent Systems, Sep. 2019, p. 473-475 (Year: 2019).*

* cited by examiner

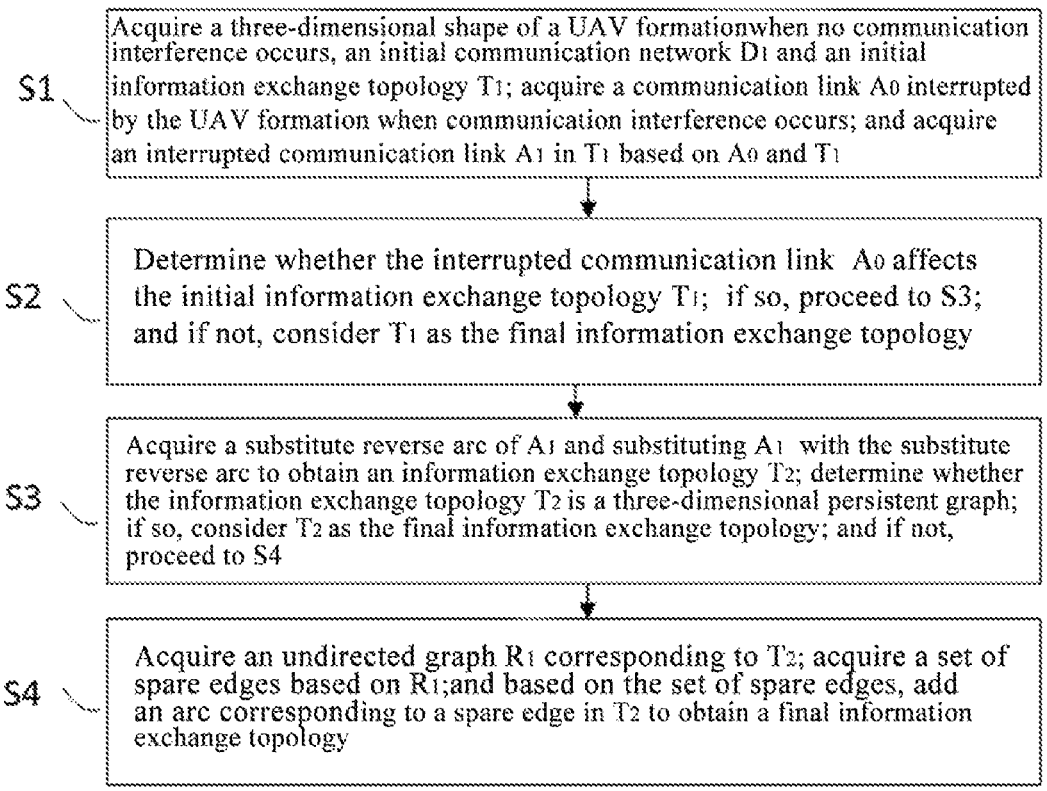

INTELLIGENT DECISION-MAKING METHOD AND DEVICE FOR UAV FORMATION INFORMATION INTERACTION TOPOLOGIES IN COMMUNICATION INTERFERENCE

CROSS-REFERENCE TO RELATED APPLICATIONS

This application claims the benefit of priority from Chinese Patent Application No. 201910991172.2, filed on Oct. 18, 2019. The content of the aforementioned application, including any intervening amendments thereto, is incorporated herein by reference in its entirety.

TECHNICAL FIELD

The present invention relates to the technical field of UAV communication and in particular to an intelligent decision-making method and device for UAV formation information interaction topologies in communication interference.

BACKGROUND OF THE PRESENT INVENTION

With the development of science and technology, UAVs have been widely applied in civil and military fields. The formation of multiple UAVs has become a trend today. All UAVs usually interaction information through point-to-point communication links to form a certain formation shape, and fly towards the target area while keeping this formation shape. The used communication links are called information interaction topologies for the UAV formation.

Communication faults may occur during the flight of the UAV formation. As a result, some communication links are unusable. Consequently, the UAV formation is unable to continue the task. In the prior art, faulty communication links are generally deleted, information interaction topologies corresponding to a three-dimensional persistent formation in the communication network at this time are acquired, and the task is continued based on the information interaction topologies.

However, it was found by the inventor of the present discourse that, during the practical application of methods in the prior art, since the UAV formation is in high-speed flying and it takes a long period of time to reacquire information interaction topologies in the prior art, the UAVs may collide with each other if the information interaction topologies for the UAV formation are not restored quickly, making the formation task failed. Therefore, there is a problem of low safety in the prior art.

SUMMARY OF THE PRESENT INVENTION

Technical Problems to be Solved

In view of the deficiency in the prior art, the present invention provides an intelligent decision-making method and device for UAV formation information interaction topologies in communication interference, to solve the technical problem of low safety in the prior art.

Technical Solutions

For this purpose, the present invention is implemented by the following technical solutions.

To solve the technical problem, the present invention provides an intelligent decision-making method for UAV formation information interaction topologies in communication interference, executed by a computer, comprising following steps:

S1: acquiring a three-dimensional shape of a UAV formation when no communication interference occurs, an initial communication network $D_1$ and an initial information interaction topology $T_1$; acquiring a set of communication links $A_0$ interrupted by the UAV formation when communication interference occurs; and acquiring a set of interrupted communication links $A_1$ in $T_1$ based on $A_0$ and $T_1$;

S2: determining whether the set of interrupted communication links $A_0$ affects the initial information interaction topology $T_1$; if so, proceeding to S3; and if not, determining $T_1$ as the final information interaction topology;

S3: acquiring a set of substitute reverse arcs of $A_1$ and substituting $A_1$ with the substitute reverse arcs to obtain an information interaction topology $T_2$; determining whether the information interaction topology $T_2$ is a three-dimensional persistent graph; if so, determining $T_2$ as the final information interaction topology; and if not, proceeding to S4; and S4: acquiring an undirected graph $R_1$ corresponding to $T_2$; acquiring a set of spare edges based on $R_1$; and based on the set of spare edges, adding an arc corresponding to a spare edge in $T_2$ to obtain a final information interaction topology.

Preferably, in the S2, determining whether $A_0$ affects $T_1$ comprises: determining whether a set formed by the set of interrupted communication links $A_1$ is an empty set; if so, determining that $A_0$ does not affect $T_1$; and if not, determining that $A_0$ affects $T_1$.

Preferably, in the S3, acquiring the substitute reverse arc comprises: S3011: deleting the set of interrupted communication links $A_0$ from the initial communication network $D_1$ to obtain a communication network $D_2$; and S3012: determining whether a reverse arc of each faulty arc in the set of interrupted communication links $A_1$ is in $D_2$; if so, determining the reversed arc as a substitute reverse arc of the faulty arc in $A_1$; and if not, continuing the determination for a next faulty arc.

Preferably, in the S3, acquiring the information interaction topology $T_2$ comprises:

S3021: deleting the set of interrupted communication links $A_1$ from the initial information interaction topology $T_1$ to obtain an information interaction topology $T_1^{\,1}$.

S3022: adding a substitute reverse arc $a_{qp}$ in $T_1^{\,1}$;

S3023: determining whether the in-degree, in $T_1^{\,1}$, of a node $v_p$ for the arc $a_{qp}$ is more than 3;

if so, finding a node $v_k$ in $T_1^{\,1}$, the in-degree of which is less than 3; acquiring a path from $v_k$ to in $T_1^{\,1}$, with all arcs in a reversed path of the path being in $D_2$, and in $T_1^{\,1}$, and reversing all arcs in the path; and if not, continuing the addition of a next substitute reverse arc; and S303: substituting all substitutable faulty arcs with corresponding substitute reverse arcs to obtain the information interaction topology $T_2$.

Preferably, in the S4, acquiring the set of spare edges comprises:

acquiring an undirected graph $R_2$ corresponding to the communication network $D_2$; and deleting edges in the $R_1$ from the $R_2$ to obtain remaining edges as spare edges, all of which form the set of spare edges.

Preferably, in the S4, acquiring the final information interaction topology comprises:

acquiring a stiffness matrix M corresponding to the $R_1$;

successively adding each spare edge in the stiffness matrix M, and determining whether the rank of the stiffness matrix M is full rank; if not, deleting the spare edge from the stiffness matrix M; and if so:

for any spare edge $e_{ij}$ determining whether the in-degree, in $T_2$, of a node $v_j$ for the spare edge $e_{ij}$ is less than 3, with an arc $a_{ij}$ being in the communication network $D_2$; if so, adding the arc $a_{ij}$ in $T_2$ to obtain an information interaction topology $T_3$; and if not:

determining whether the in-degree, in $T_2$, of a node $v_i$ is less than 3, with an arc $a_{ji}$ being in the communication network $D_2$; if so, adding the arc $a_{ji}$ in $T_2$ to obtain an information interaction topology $T_3$; and if not:

determining whether the arc $a_{ij}$ is in the communication network $D_2$; if so, adding the arc $a_{ji}$ in $T_2$, finding a node $v_o$ in $T_2$, the in-degree of which is less than 3, acquiring a path from $v_o$ to $v_j$ in $T_2$, with all arcs in a reversed path of the path being in $D_2$, and in $T_2$, reversing all arcs in the path to obtain an information interaction topology $T_3$; if not, adding the arc $a_{ji}$ in $T_2$, finding a node $v_o$ in $T_2$, the in-degree of which is less than 3, acquiring a path from $v_o$ to $v_i$ in $T_2$, with all arcs in a reversed path of the path being in $D_2$, and in $T_2$, reversing all arcs in the path to obtain an information interaction topology $T_3$; and determining whether $T_3$ is a three-dimensional persistent graph; if so, determining $T_3$ as the final information interaction topology; and if not, continuing the addition of a next spare edge and repeating the above steps.

To solve the technical problem, the present invention provides an intelligent decision-making device for UAV formation information interaction topologies in communication interference, comprising a computer, the computer comprising:

at least one storage unit; and at least one processing unit, wherein the at least one storage unit stores at least one instruction that is loaded and executed by the at least one processing unit to perform following steps:

S1: acquiring a three-dimensional shape of a UAV formation when no communication interference occurs, an initial communication network $D_1$ and an initial information interaction topology $T_1$; acquiring a set of communication links $A_0$ interrupted by the UAV formation when communication interference occurs; and acquiring a set of interrupted communication links $A_1$ in $T_1$ based on $A_0$ and $T_1$;

S2: determining whether the set of interrupted communication links $A_0$ affects the initial information interaction topology $T_1$; if so, proceeding to S3; and if not, determining $T_1$ as the final information interaction topology;

S3: acquiring a set of substitute reverse arcs of $A_1$ and substituting $A_1$ with the substitute reverse arcs to obtain an information interaction topology $T_2$; determining whether the information interaction topology $T_2$ is a three-dimensional persistent graph; if so, determining $T_2$ as the final information interaction topology; and if not, proceeding to S4; and S4: acquiring an undirected graph $R_1$ corresponding to $T_2$; acquiring a set of spare edges based on $R_1$; and based on the set of spare edges, adding an arc corresponding to a spare edge in $T_2$ to obtain a final information interaction topology.

Preferably, in the S3, acquiring the substitute reverse arc comprises:

S3011: deleting the set of interrupted communication links $A_0$ from the initial communication network $D_1$ to obtain a communication network $D_2$; and S3012: determining whether a reverse arc of each faulty arc in the set of interrupted communication links $A_1$ is in $D_2$; if so, determining the reversed arc as a substitute reverse arc of the faulty arc in $A_1$; and if not, continuing the determination for a next faulty arc.

Preferably, in the S3, determining whether $A_1$ can be substituted by the substitute reverse arc comprises:

S3021: deleting the set of interrupted communication links $A_1$ from the initial information interaction topology $T_1$ to obtain an information interaction topology $T_1^1$.

S3022: adding a substitute reverse arc $a_{qp}$ in $T_1^1$;

S3023: determining whether the in-degree, in $T_1^1$, of a node for the arc $a_{qp}$ is more than 3;

if so, finding a node $v_k$ in $T_1^1$, the in-degree of which is less than 3; acquiring a path from $v_k$ to in $T_1^1$, with all arcs in a reversed path of the path being in $D_2$, and in $T_1^1$, and reversing all arcs in the path; and if not, continuing the addition of a next substitute reverse arc; and S303: substituting all substitutable faulty arcs with corresponding substitute reverse arcs to obtain the information interaction topology $T_2$.

Preferably, in the S4, acquiring the set of spare edges comprises:

acquiring an undirected graph $R_2$ corresponding to the communication network $D_2$; acquiring a stiffness matrix M corresponding to the $R_1$; and deleting edges in the $R_1$ from the $R_2$ to obtain remaining edges as spare edges, all of which form the set of spare edges.

Beneficial Effect

The present invention provides an intelligent decision-making method and device for UAV formation information interaction topologies in communication interference. Compared with the prior art, the present invention has following beneficial effects.

In the present invention, a three-dimensional shape of a UAV formation when no communication interference occurs, an initial communication network $D_1$ and an initial information interaction topology $T_1$ are acquired; a set of communication links $A_0$ interrupted by the UAV formation when communication interference occurs is acquired; and a set of interrupted communication links $A_1$ in $T_1$ based on $A_0$ and $T_1$ is acquired; it is determined whether the set of interrupted communication links $A_0$ affects the initial information interaction topology $T_1$; if not, $T_1$ is considered as the final information interaction topology; and if so, a set of substitute reverse arcs of $A_1$ is acquired and $A_1$ is substituted with the substitute reverse arcs to obtain an information interaction topology $T_2$; it is determined whether the information interaction topology $T_2$ is a three-dimensional persistent graph; if so, $T_2$ is considered as the final information interaction topology; and if not, an undirected graph $R_1$ corresponding to $T_2$ is acquired; a set of spare edges is acquired based on $R_1$; and based on the set of spare edges, an arc corresponding to a spare edge is added in $T_2$ to obtain a final information interaction topology. In the present invention, first, it is tried to substitute a faulty arc with its reverse arc to restore part of an information interaction topology; and then, a spare edge is acquired and an arc corresponding to the spare edge is added, to obtain a complete information interaction topology corresponding to the three-dimension persistent formation. In this way, the UAV formation can keep the formation shape stably during a task. Both the safety and the reliability are high.

BRIEF DESCRIPTION OF THE DRAWINGS

In order to explain technical solutions of embodiments of the present invention or in the prior art more clearly, the accompany drawings to be used in the description of the embodiments or the prior art will be introduced simply. Apparently, the drawings to be described below are merely some embodiments of the present invention, a person of ordinary skill in the art can obtain other drawings according to these drawings without paying any creative effort.

FIG. 1 is an overall flowchart of an intelligent decision-making method for UAV formation information interaction topologies in communication interference according to an embodiment of the present invention.

DETAILED DESCRIPTION OF THE PRESENT INVENTION

To make the purposes, technical solutions and advantages of the embodiments of the present invention clearer, the technical solutions in the embodiments of the present invention will be described clearly and completely. Obviously, the embodiments to be described are some, but not all, embodiments of the present invention. Based on the embodiments of the present invention, all other embodiments obtained by a person of ordinary skill in the art without paying any creative effort are within the protection scope of the present invention.

The embodiments of the present application provide an intelligent decision-making method and device for UAV formation information interaction topologies in communication interference, to solve the technical problem of low safety in the prior art and improve the safety of UAV formations during their task.

To solve the technical problem, the following technical solution is employed.

In an embodiment of the present invention, a three-dimensional shape of a UAV formation when no communication interference occurs, an initial communication network $D_1$ and an initial information interaction topology $T_1$ are acquired; a set of communication links $A_0$ interrupted by the UAV formation when communication interference occurs is acquired; and a set of interrupted communication links $A_1$ in $T_1$ based on $A_0$ and $T_1$ is acquired; it is determined whether the set of interrupted communication link $A_0$ affects the initial information interaction topology $T_1$; if not, $T_1$ is considered as the final information interaction topology; and if so, a set of substitute reverse arcs of $A_1$ is acquired and $A_1$ is substituted with the substitute reverse arcs to obtain an information interaction topology $T_2$; it is determined whether the information interaction topology $T_2$ is a three-dimensional persistent graph; if so, $T_2$ is considered as the final information interaction topology; and if not, an undirected graph $R_1$ corresponding to $T_2$ is acquired; a set of spare edges is acquired based on $R_1$; and based on the set of spare edges, an arc corresponding to a spare edge is added in $T_2$ to obtain a final information interaction topology. In the embodiment of the present invention, first, it is tried to substitute a faulty arc with its reverse arc to restore part of an information interaction topology; and then, a spare edge is acquired and an arc corresponding to the spare edge is added, to obtain a complete information interaction topology corresponding to the three-dimension persistent formation. In this way, the UAV formation can keep the formation shape stably during a task. Both the safety and the reliability are high.

To better understand the technical solution, the technical solution will be described below in detail with reference to the accompanying drawing by specific implementations.

An embodiment of the present invention provides an intelligent decision-making method for UAV formation information interaction topologies in communication interference, executed by a computer, as shown in FIG. 1, comprising following steps:

S1: acquiring a three-dimensional shape of a UAV formation when no communication interference occurs, an initial communication network $D_1$ and an initial information interaction topology $T_1$; acquiring a set of communication links $A_0$ interrupted by the UAV formation when communication interference occurs; and acquiring a set of interrupted communication links $A_1$ in $T_1$ based on $A_0$ and $T_1$;

S2: determining whether the set of interrupted communication links $A_0$ affects the initial information interaction topology $T_1$; if so, proceeding to S3; and if not, determining $T_1$ as the final information interaction topology;

S3: acquiring a set of substitute reverse arcs of $A_1$ and substituting $A_1$ with the substitute reverse arcs to obtain an information interaction topology $T_2$; determining whether the information interaction topology $T_2$ is a three-dimensional persistent graph; if so, determining $T_2$ as the final information interaction topology; and if not, proceeding to S4; and S4: acquiring an undirected graph $R_1$ corresponding to $T_2$; acquiring a set of spare edges based on $R_1$; and based on the set of spare edges, adding an arc corresponding to a spare edge in $T_2$ to obtain a final information interaction topology.

In an embodiment of the present invention, a three-dimensional shape of a UAV formation when no communication interference occurs, an initial communication network $D_1$ and an initial information interaction topology $T_1$ are acquired; a set of communication links $A_0$ interrupted by the UAV formation when communication interference occurs is acquired; and a set of interrupted communication links $A_1$ in $T_1$ based on $A_0$ and $T_1$ is acquired; it is determined whether the set of interrupted communication links $A_0$ affects the initial information interaction topology $T_1$; if not, $T_1$ is considered as the final information interaction topology; and if so, a set of substitute reverse arcs of $A_1$ is acquired and $A_1$ is substituted with the substitute reverse arcs to obtain an information interaction topology $T_2$; it is determined whether the information interaction topology $T_2$ is a three-dimensional persistent graph; if so, $T_2$ is considered as the final information interaction topology; and if not, an undirected graph $R_1$ corresponding to $T_2$ is acquired; a set of spare edges is acquired based on $R_1$; and based on the set of spare edges, an arc corresponding to a spare edge is added in $T_2$ to obtain a final information interaction topology. In the embodiment of the present invention, first, it is tried to substitute a faulty arc with its reverse arc to restore part of an information interaction topology; and then, a spare edge is acquired and an arc corresponding to the spare edge is added, to obtain a complete information interaction topology corresponding to the three-dimension persistent formation. In this way, the UAV formation can keep the formation shape stably during a task. Both the safety and the reliability are high.

Specifically, in the embodiment of the present invention, during the specific implementation, the decision-making method is executed by a computer in a control center on the ground; and then the computation results are sent to each UAV. In this way, the quick generation of information interaction topologies for a multi-UAV three-dimensional formation is realized.

The steps will be specifically described below.

In the S1, a three-dimensional shape of a UAV formation when no communication interference occurs, an initial communication network $D_1$ and an initial information interaction topology $T_1$ are acquired; a set of communication links $A_0$ interrupted by the UAV formation when communication interference occurs is acquired; and a set of interrupted communication links $A_1$ in $T_1$ is acquired based on $A_0$ and $T_1$.

Specifically, first, a three-dimensional shape S of a UAV formation when no communication interference occurs, an initial communication network $D_1$ and an initial information interaction topology $T_1$ are acquired.

In the embodiment of the present invention, total n UAVs form, by one-way communication between UAVs, a three-dimensional formation shape S and keep them in this formation shape. n positions in this formation shape S are numbered by $\{1, 2, \ldots, n\}$, respectively.

An initial communication network for the UAV formation is $D_1$=(V, A) where:

$V=\{v_i\}$, $1 \le i \le n$ is a set of nodes represented by the UAVs, where $v_i$ denotes $UAV_i$, i.e., the $i^{th}$ UAV; and $A=\{a_{ij}\} \subseteq V \times V$, $1 \le i, j \le n$ is a set of arcs each formed by two nodes, where an arc $a_{ij}=(v_i, v_j)$ indicates that there is an available communication link from $UAV_i$ to $UAV_j$, by which $UAV_i$ can send information to $UAV_j$.

An information interaction topology for the UAV formation is $T_1$=(V, A*).

A* is a set of arcs corresponding to communication links in the information interaction topology.

A set of communication links $A_0$ interrupted by the UAV formation when a communication fault occurs is acquired. Specifically, there may be one or more interrupted communication links. In the embodiment of the present invention, $A_0$ is a set of arcs formed by all interrupted communication links.

A set of interrupted communication links $A_1$ in $T_1$ is acquired based on $A_0$ and $T_1$. Specifically, $A_1$ denotes a set of interrupted communication links in the initial information interaction topology $T_1$. That is:

$$A_1 = A^* \cap A_0$$

In the S2, it is determined whether the set of interrupted communication links $A_0$ affects the initial information interaction topology $T_1$; if so, the process proceeds to S3; and if not, $T_1$ is considered as the final information interaction topology.

Specifically, the determination is as follows:

determining whether a set formed by the set of interrupted communication links $A_1$ is an empty set; if so, determining that $A_0$ does not affect $T_1$; and if not, determining that $A_0$ affects $T_1$.

That is, when there is no interrupted communication link in $T_1$, $A_0$ does not affect $T_1$. In this case, $T_1$ may be continuously used as the information interaction topology for the UAV formation.

In the S3, a set of substitute reverse arcs of $A_1$ is acquired and $A_1$ is substituted with the substitute reverse arcs to obtain an information interaction topology $T_2$; it is determined whether the information interaction topology $T_2$ is a three-dimensional persistent graph; if so, $T_2$ is considered as the final information interaction topology; and if not, the process proceeds to S4.

Specifically, the following steps are included.

S3011: The set of interrupted communication links $A_0$ is deleted from the initial communication network $D_1$ to obtain a communication network $D_2$.

S3012: It is determined whether a reverse arc of each faulty arc in the set of interrupted communication links $A_1$ is in $D_2$; if so, the reversed arc is considered as a set of substitute reverse arcs of the faulty arc in $A_1$; and if not, the determination for a next faulty arc is continued.

S3021: The set of interrupted communication links $A_1$ is deleted from the initial information interaction topology $T_1$ to obtain an information interaction topology $T_1^1$.

S3022: A substitute reverse arc $a_{qp}$ is added in $T_1^1$.

S3023: It is determined whether the in-degree, in $T_1^1$, of a node $v_p$ for the arc $a_{qp}$ is more than 3.

If so, a node $v_k$ in $T_1^1$, the in-degree of which is less than 3, is found; a path from $v_k$ to $v_p$ is acquired in $T_1^1$, with all arcs in a reversed path of the path being in $D_2$, and in $T_1^1$, and all arcs in the path are reversed.

If not, the addition of a next substitute reverse arc is continued.

S303: All substitutable faulty arcs are substituted with corresponding substitute reverse arcs to obtain the information interaction topology $T_2$.

In the embodiment of the present invention, during the specific implementation, first, it is determined whether the reverse arc of a faulty arc is in $D_2$; and if the reverse arc is in $D_2$, the reverse arc is used as the set of substitute reverse arcs of this faulty arc. All substitute reverse arcs are obtained and added in $T_1^1$ one by one. Then, it is determined whether to reverse all arcs in a path. If so, all arcs in the path are reversed to obtain the information interaction topology $T_2$.

It is to be noted that the present invention further provides another embodiment to acquire the information interaction topology $T_2$. Specifically, it is determined whether there is a substitute reverse arc for a first faulty arc in the set of interrupted communication links $A_1$; if there is a substitute reverse arc for the first faulty arc, the faulty arc is substituted with the substitute reverse arc, it is then determined whether to reverse all arcs in a path, and after the process of the first faulty arc ends, the determination whether there is a substitute reverse arc for a next faulty arc is continued; and if there is no substitute reverse arc for the first faulty arc, the determination whether there is a substitute reverse arc for a next faulty arc is directly performed followed by the subsequent operations. All substitutable faulty arcs are substituted with corresponding substitute reverse arcs to obtain the information interaction topology $T_2$.

S304: It is determined whether $T_2$ is a three-dimensional persistent graph; if so, $T_2$ is considered as the final information interaction topology; and if not, the process proceeds to S4.

In the S4, an undirected graph $R_1$ corresponding to $T_2$ is acquired, a set of spare edges is acquired based on $R_1$; and based on the set of spare edges, an arc corresponding to a spare edge is added in $T_2$ to obtain a final information interaction topology.

Specifically, acquiring the set of spare edges comprises:

acquiring an undirected graph $R_2$ corresponding to the communication network $D_2$; and deleting edges in the $R_1$ from the $R_2$ to obtain remaining edges as spare edges, all of which form the set of spare edges.

Acquiring the final information interaction topology comprises:

acquiring a stiffness matrix M corresponding to the $R_1$;

successively adding each spare edge in the stiffness matrix M, and determining whether the rank of the stiffness matrix M is full rank; if not, deleting the spare edge from the stiffness matrix M; and if so:

for any spare edge $e_{ij}$, determining whether the in-degree, in $T_2$, of a node $v_j$ for the spare edge $e_{ij}$ is less than 3, with an arc $a_{ij}$ being in the communication network $D_2$; if so, adding the arc $a_{ij}$ in $T_2$ to obtain an information interaction topology $T_3$; and if not:

determining whether the in-degree, in $T_2$, of a node $v_i$ is less than 3, with an arc $a_{ji}$ being in the communication network $D_2$; if so, adding the arc $a_{ji}$ in $T_2$ to obtain an information interaction topology $T_3$; and if not:

determining whether the arc $a_{ij}$ is in the communication network $D_2$; if so, adding the arc $a_{ij}$ in $T_2$, finding a node $v_o$ in $T_2$, the in-degree of which is less than 3, acquiring a path from $v_o$ to $v_j$ in $T_2$, with all arcs in a reversed path of the path being in $D_2$, and in $T_2$, reversing all arcs in the path to obtain an information interaction topology $T_3$; if not, adding the arc $a_{ji}$ in $T_2$, finding a node $v_o$ in $T_2$, the in-degree of which is less than 3, acquiring a path from $v_o$ to $v_i$ in $T_2$, with all arcs in a reversed path of the path being in $D_2$, and in $T_2$, reversing all arcs in the path to obtain an information interaction topology $T_3$; and determining whether $T_3$ is a three-dimensional persistent graph; if so, determining $T_3$ as the final information interaction topology; and if not, continuing the addition of a next spare edge and repeating the above steps.

The obtained final information interaction topology is the information interaction topology executed by the UAV formation during its follow-up task.

An embodiment of the present invention further provides an intelligent decision-making device for UAV formation information interaction topologies in communication interference, comprising a computer, the computer comprising:

at least one storage unit; and at least one processing unit, wherein the at least one storage unit stores at least one instruction that is loaded and executed by the at least one processing unit to perform following steps:

S1: acquiring a three-dimensional shape of a UAV formation when no communication interference occurs, an initial communication network $D_1$ and an initial information interaction topology $T_1$; acquiring a set of communication links $A_0$ interrupted by the UAV formation when communication interference occurs; and acquiring a set of interrupted communication links $A_1$ in $T_1$ based on $A_0$ and $T_1$;

S2: determining whether the set of interrupted communication links $A_0$ affects the initial information interaction topology $T_1$; if so, proceeding to S3; and if not, determining $T_1$ as the final information interaction topology;

S3: acquiring a set of substitute reverse arcs of $A_1$ and substituting $A_1$ with the substitute reverse arcs to obtain an information interaction topology $T_2$; determining whether the information interaction topology $T_2$ is a three-dimensional persistent graph; if so, determining $T_2$ as the final information interaction topology; and if not, proceeding to S4; and S4: acquiring an undirected graph $R_1$ corresponding to $T_2$; acquiring a set of spare edges based on $R_1$; and based on the set of spare edges, adding an arc corresponding to a spare edge in $T_2$ to obtain a final information interaction topology.

It may be understood that the decision-making device in this embodiment of the present invention corresponds to the decision-making method described above, and the explanations, examples and beneficial effects of related aspects of the decision-making device may refer to the corresponding aspects of the intelligent decision-making method for UAV formation information interaction topologies in communication interference and will not be repeated here.

In conclusion, compared with the prior art, the present invention has following beneficial effects.

In the embodiment of the present invention, a three-dimensional shape of a UAV formation when no communication interference occurs, an initial communication network $D_1$ and an initial information interaction topology $T_1$ are acquired; a set of communication links $A_0$ interrupted by the UAV formation when communication interference occurs is acquired; and a set of interrupted communication links $A_1$ in $T_1$ based on $A_0$ and $T_1$ is acquired; it is determined whether the set of interrupted communication links $A_0$ affects the initial information interaction topology $T_1$; if not, $T_1$ is considered as the final information interaction topology; and if so, a set of substitute reverse arcs of $A_1$ is acquired and $A_1$ is substituted with the substitute reverse arcs to obtain an information interaction topology $T_2$; it is determined whether the information interaction topology $T_2$ is a three-dimensional persistent graph; if so, $T_2$ is considered as the final information interaction topology; and if not, an undirected graph $R_1$ corresponding to $T_2$ is acquired; a set of spare edges is acquired based on $R_1$; and based on the set of spare edges, an arc corresponding to a spare edge is added in $T_2$ to obtain a final information interaction topology. In the embodiment of the present invention, first, it is tried to substitute a faulty arc with its reverse arc to restore part of an information interaction topology; and then, a spare edge is acquired and an arc corresponding to the spare edge is added, to obtain a complete information interaction topology corresponding to the three-dimension persistent formation. In this way, the UAV formation can keep the formation shape stably during a task. Both the safety and the reliability are high.

It should be noted that, through the description of the above implementations, it can be clearly understood by those skilled in the art that the implementations can be implemented by means of software plus necessary universal hardware platforms. Based on such understanding, the above-mentioned technical solution or the part that contributes to the existing technology can be embodied in the form of a software product. The computer software product can be stored in a computer-readable storage medium, for example, an ROM/RAM, a disc, a compact disc, etc., and can include a plurality of instructions configured to direct a computer device (personal computer, server, or network device) to execute the method described in each embodiment or in a part of the embodiment. In the specification provided here, a large number of specific details have been described. However, it should be understood that the embodiments of the present invention can be practiced even without those specific details. In some instances, the well-known methods, structures and technologies have not been detailed to avoid obscuring the specification.

Herein, relative terms such as "first" and "second" are used only to distinguish one entity or operation from another entity or operation, and do not necessarily require or imply any such relationship or order between these entities or operations. Moreover, the terms "including", "comprising", or any other variations thereof are intended to encompass non-exclusive inclusion, such that a process, method, article, or device that includes a series of elements includes not only those elements but also those that are not explicitly listed or other elements inherent to such a process, method, article, or device. Without more restrictions, the elements defined by the sentence "including a . . . " do not exclude the existence of other identical elements in the process, method, article, or equipment that includes the elements.

The above embodiments are only used to illustrate the technical solutions of the present invention, rather than limiting the present invention. Although the present invention has been described in detail with reference to the aforementioned embodiments, it should be understood that modifications and equivalent replacements may be made by a person of ordinary skill in the art without departing from the spirit and scope of the present invention.

We claim:

1. An intelligent decision-making method for Unmanned Aerial Vehicle (UAV) formation information interaction topologies in communication interference, executed by a computer, comprising following steps:
   - S1: acquiring a three-dimensional shape of a UAV formation when no communication interference occurs, an initial communication network ($D_1$) and an initial information interaction topology ($T_1$); acquiring a set of first interrupted communication links ($A_0$) interrupted by the UAV formation when communication interference occurs; and acquiring a set of second interrupted communication links ($A_1$) in the initial information interaction topology ($T_1$) based on the set of first interrupted communication links ($A_0$) and the initial information interaction topology ($T_1$);
   - S2: determining whether the set of first interrupted communication links ($A_0$) affects the initial information interaction topology ($T_1$); if so, proceeding to S3; and if not, determining the initial information interaction topology ($T_1$) as the final information interaction topology;
   - S3: acquiring a set of substitute reverse arcs of the set of second interrupted communication links ($A_1$) and substituting the set of second interrupted communication links ($A_1$) with the substitute reverse arcs to obtain an information interaction topology ($T_2$); determining whether the information interaction topology ($T_2$) is a three-dimensional persistent graph; if so, determining the information interaction topology ($T_2$) as the final information interaction topology; and if not, proceeding to S4; and
   - S4: acquiring an undirected graph ($R_1$) corresponding to the information interaction topology ($T_2$); acquiring a set of spare edges based on the undirected graph ($R_1$); and based on the set of spare edges, adding an arc corresponding to a spare edge in the information interaction topology ($T_2$) to obtain a final information interaction topology;
   wherein, in the S3, acquiring the substitute reverse arc comprises:
   - S3011: deleting the set of first interrupted communication links ($A_0$) from the initial communication network ($D_1$) to obtain a communication network ($D_2$); and
   - S3012: determining whether a reverse arc of each faulty arc in the set of second interrupted communication links ($A_1$) is in the communication network ($D_2$); if so, determining the reversed arc as a substitute reverse arc of the faulty arc in the set of second interrupted communication links ($A_1$); and if not, continuing the determination for a next faulty arc;
   in the S3, acquiring the information interaction topology ($T_2$) comprises:
   - S3021: deleting the set of second interrupted communication links ($A_1$) from the initial information interaction topology ($T_1$) to obtain an information interaction topology ($T_1^1$);
   - S3022: adding a substitute reverse arc ($a_{qp}$) in the information interaction topology ($T_1^1$);
   - S3023: determining whether the in-degree, in the information interaction topology ($T_1^1$), of a first node ($v_p$) for the substitute reverse arc ($a_{qp}$) is more than 3;
   if so, finding a second node ($v_k$) in the information interaction topology ($T_1^1$), the in-degree of which is less than 3: acquiring a path from the second node ($v_k$) to the first node ($v_p$) in the information interaction topology ($T_1^1$), with all arcs in a reversed path of the path being in the communication network ($D_2$), and in the information interaction topology ($T_1^1$), and reversing all arcs in the path; and
   if not, continuing the addition of a next substitute reverse arc; and
   - S303: substituting all substitutable faulty arcs with corresponding substitute reverse arcs to obtain the information interaction topology ($T_2$).

2. The decision-making method according to claim 1, wherein, in the S2, determining whether the set of first interrupted communication links ($A_0$) affects the initial information interaction topology ($T_1$) comprises:
   determining whether a set formed by the set of second interrupted communication links ($A_1$) is an empty set; if so, determining that the set of first interrupted communication links ($A_0$) does not affect the initial information interaction topology ($T_1$); and if not, determining that the set of first interrupted communication links ($A_0$) affects the initial information interaction topology ($T_1$).

3. An intelligent decision-making method for Unmanned Aerial Vehicle (UAV) formation information interaction topologies in communication interference, executed by a computer, comprising following steps:
   - S1: acquiring a three-dimensional shape of a UAV formation when no communication interference occurs, an initial communication network ($D_1$) and an initial information interaction topology ($T_1$); acquiring a set of first interrupted communication links ($A_0$) interrupted by the UAV formation when communication interference occurs; and acquiring a set of second interrupted communication links ($A_1$) in the initial information interaction topology ($T_1$) based on the set of first interrupted communication links ($A_0$) and the initial information interaction topology ($T_1$);
   - S2: determining whether the set of first interrupted communication links ($A_0$) affects the initial information interaction topology ($T_1$); if so, proceeding to S3; and if not, determining the initial information interaction topology ($T_1$) as the final information interaction topology;
   - S3: acquiring a set of substitute reverse arcs of the set of second interrupted communication links ($A_1$) and substituting the set of second interrupted communication links ($A_1$) with the substitute reverse arcs to obtain an information interaction topology ($T_2$); determining whether the information interaction topology ($T_2$) is a three-dimensional persistent graph; if so, determining the information interaction topology ($T_2$) as the final information interaction topology; and if not, proceeding to S4; and
   - S4: acquiring an undirected graph ($R_1$) corresponding to the information interaction topology ($T_2$); acquiring a set of spare edges based on the undirected graph ($R_1$); and based on the set of spare edges, adding an arc corresponding to a spare edge in the information interaction topology ($T_2$) to obtain a final information interaction topology;

wherein, in the S3, acquiring the substitute reverse arc comprises:

S3011: deleting the set of first interrupted communication links ($A_0$) from the initial communication network ($D_1$) to obtain a communication network ($D_2$); and S3012: determining whether a reverse arc of each faulty arc in the set of second interrupted communication links ($A_1$) is in the communication network ($D_2$); if so, determining the reversed arc as a substitute reverse arc of the faulty arc in the set of second interrupted communication links ($A_1$); and if not, continuing the determination for a next faulty arc;

wherein, in the S4, acquiring the set of spare edges comprises:

acquiring an undirected graph ($R_2$) corresponding to the communication network ($D_2$); and deleting edges in the undirected graph ($R_1$) from the undirected graph ($R_2$) to obtain remaining edges as spare edges, all of which form the set of spare edges.

4. The decision-making method according to claim 3, wherein, in the S4, acquiring the final information interaction topology comprises:

acquiring a stiffness matrix (M) corresponding to the undirected graph ($R_1$);

successively adding each spare edge in the stiffness matrix (M), and determining whether the rank of the stiffness matrix (M) is full rank; if not, deleting the spare edge from the stiffness matrix (M); and if so:

for any spare edge ($e_{ij}$), determining whether the in-degree, in the information interaction topology ($T_2$), of a third node ($v_j$) for the spare edge ($e_{ij}$) is less than 3, with an arc ($a_{ij}$) being in the communication network ($D_2$); if so, adding the arc ($a_{ij}$) in the information interaction topology ($T_2$) to obtain an information interaction topology ($T_3$); and if not:

determining whether the in-degree, in the information interaction topology ($T_2$), of a fourth node ($v_i$) is less than 3, with an arc ($a_{ji}$) being in the communication network ($D_2$); if so, adding the arc ($a_{ji}$) in the information interaction topology ($T_2$) to obtain an information interaction topology ($T_3$); and if not:

determining whether the arc ($a_{ij}$) is in the communication network ($D_2$); if so, adding the arc ($a_{ij}$) in the information interaction topology ($T_2$), finding a fifth node ($v_o$) in the information interaction topology ($T_2$), the in-degree of which is less than 3, acquiring a path from the fifth node ($v_o$) to the third node ($v_j$) in the information interaction topology ($T_2$), with all arcs in a reversed path of the path being in the communication network ($D_2$), and in the information interaction topology ($T_2$), reversing all arcs in the path to obtain an information interaction topology ($T_3$); if not, adding the arc ($a_{ji}$) in the information interaction topology ($T_2$), finding the fifth node ($v_o$) in the information interaction topology ($T_2$), the in-degree of which is less than 3, acquiring a path from the fifth node ($v_o$) to the fourth node ($v_i$) in the information interaction topology ($T_2$), with all arcs in a reversed path of the path being in the communication network ($D_2$), and in the information interaction topology ($T_2$), reversing all arcs in the path to obtain an information interaction topology ($T_3$); and determining whether the information interaction topology ($T_3$) is a three-dimensional persistent graph; if so, determining the information interaction topology ($T_3$) as the final information interaction topology; and if not, continuing the addition of a next spare edge and repeating the above steps.

5. An intelligent decision-making device for UAV formation information interaction topologies in communication interference, comprising a computer, the computer comprising:

at least one storage unit; and at least one processing unit, wherein the at least one storage unit stores at least one instruction that is loaded and executed by the at least one processing unit to perform following steps:

S1: acquiring a three-dimensional shape of a UAV formation when no communication interference occurs, an initial communication network ($D_1$) and an initial information interaction topology ($T_1$); acquiring a set of first interrupted communication links ($A_0$) interrupted by the UAV formation when communication interference occurs; and acquiring a set of second interrupted communication links ($A_1$) in the initial information interaction topology ($T_1$) based on the set of first interrupted communication links ($A_0$) and the initial information interaction topology ($T_1$);

S2: determining whether the set of first interrupted communication links ($A_0$) affects the initial information interaction topology ($T_1$); if so, proceeding to S3; and if not, determining the initial information interaction topology ($T_1$) as the final information interaction topology;

S3: acquiring a set of substitute reverse arcs of the set of second interrupted communication links ($A_1$) and substituting the set of second interrupted communication links ($A_1$) with the substitute reverse arcs to obtain an information interaction topology ($T_2$); determining whether the information interaction topology ($T_2$) is a three-dimensional persistent graph; if so, determining the information interaction topology ($T_2$) as the final information interaction topology; and if not, proceeding to S4; and S4: acquiring an undirected graph ($R_1$) corresponding to the information interaction topology ($T_2$); acquiring a set of spare edges based on the undirected graph ($R_1$); and based on the set of spare edges, adding an arc corresponding to a spare edge in the information interaction topology ($T_2$) to obtain a final information interaction topology;

wherein, in the S3, acquiring the substitute reverse arc comprises:

S3011: deleting the set of first interrupted communication links ($A_0$) from the initial communication network ($D_1$) to obtain a communication network ($D_2$); and S3012: determining whether a reverse arc of each faulty arc in the set of second interrupted communication links ($A_1$) is in the communication network ($D_2$); if so, determining the reversed arc as a substitute reverse arc of the faulty arc in the set of second interrupted communication links ($A_1$); and if not, continuing the determination for a next faulty arc;

wherein, in the S3, determining whether the set of second interrupted communication links ($A_1$) can be substituted by the set of substitute reverse arcs comprises:

S3021: deleting the set of second interrupted communication links ($A_1$) from the initial information interaction topology ($T_1$) to obtain an information interaction topology ($T_1^1$);

S3022: adding a substitute reverse arc ($a_{qp}$) in the information interaction topology ($T_1^1$);

S3023: determining whether the in-degree, in the information interaction topology ($T_1^1$), of a first node ($v_p$) for the substitute reverse arc ($a_{qp}$) is more than 3;

if so, finding a second node ($v_k$) in the information interaction topology ($T_1^1$), the in-degree of which is less than 3: acquiring a path from the second node (v) to the first node ($v_p$) in the information interaction topology ($T_1^1$), with all arcs in a reversed path of the path being in the communication network ($D_2$), and in the information interaction topology ($T_1^1$), and reversing all arcs in the path; and if not, continuing the addition of a next substitute reverse arc; and S303: substituting all substitutable faulty arcs with corresponding substitute reverse arcs to obtain the information interaction topology ($T_2$).

6. The decision-making device according to claim 5, wherein, in the S4, acquiring the set of spare edges comprises:

acquiring an undirected graph ($R_2$) corresponding to the communication network ($D_2$); acquiring a stiffness matrix (M) corresponding to the undirected graph ($R_1$); and deleting edges in the undirected graph ($R_1$) from the undirected graph ($R_2$) to obtain remaining edges as spare edges, all of which form the set of spare edges.

* * * * *